(12) United States Patent
Yang et al.

(10) Patent No.: US 10,204,105 B2
(45) Date of Patent: Feb. 12, 2019

(54) CONVERSATION TIMELINE MAPPING (71) Applicant: Cisco Technology, Inc., San Jose, CA (US)

(72) Inventors: Mingfeng Yang, Hefei (CN); Yasi Xi, Hefei (CN); Bo Huang, Hefei (CN); Rongrong Pan, Hefei (CN)

(73) Assignee: Cisco Technology, Inc., San Jose, CA (US)

( * ) Notice: Subject to any disclaimer, the term of this patent is extended or adjusted under 35 U.S.C. 154(b) by 269 days.

(21) Appl. No.: 15/044,137

(22) Filed: Feb. 16, 2016

(65) Prior Publication Data
US 2017/0235739 A1 Aug. 17, 2017

(51) Int. Cl.
| | | |
|---|---|---|
| *G06F 3/00* | (2006.01) | |
| *G06F 17/30* | (2006.01) | |
| *G06F 3/0481* | (2013.01) | |
| *H04L 12/18* | (2006.01) | |
| *H04L 12/58* | (2006.01) | |

(52) U.S. Cl.
CPC ...... *G06F 17/30064* (2013.01); *G06F 3/0481* (2013.01); *H04L 12/1813* (2013.01); *H04L 51/04* (2013.01)

(58) Field of Classification Search
CPC .............................. G06Q 10/06; H04L 12/1813
USPC .......................... 715/716, 744, 752; 709/206
See application file for complete search history.

(56) References Cited

U.S. PATENT DOCUMENTS

| | | | | |
|---|---|---|---|---|
| 5,717,869 | A * | 2/1998 | Moran | G06Q 10/10 707/999.002 |
| 8,245,135 | B2 * | 8/2012 | Cai | G06F 17/30884 707/708 |
| 9,020,965 | B1 * | 4/2015 | Sehrer | G06Q 50/01 707/758 |
| 2007/0206764 | A1 * | 9/2007 | Keren | G06F 11/3466 379/265.01 |
| 2013/0218987 | A1 | 8/2013 | Chudge et al. | |

FOREIGN PATENT DOCUMENTS

WO 02/093414 11/2002

OTHER PUBLICATIONS

Thomson Innovation ThemeScape; available on the web at: http://ip-science.thomsonreuters.com/winningmove/secure/TI_Themescape_QT.html#3; Feb. 1, 2016.
Bloomberg Chat Room—Catelas; available on the web at: http://catelas.com/bloomberg-chat-room/; Sep. 15, 2015.
DuVander, Adam; "Best New Mashups: Twitter Heat Map, Guardian Vizualization and Facebook Chat"; Sep. 25, 2009.
Frazer, Meghan; "Visualizing DSpace Data with Google Fusion Table & Viewshare"; available on the web at: http://acrl.ala.org/techconnect/post/tag/data-visualization; Nov. 5, 2012.

(Continued)

*Primary Examiner* — Andrey Belousov (57) ABSTRACT

In one embodiment a method for presenting conversational history is implemented on a computing device and includes: deriving a collaboration activity index as a function of at least a frequency of a conversation's communications over a period of time, mapping the collaboration activity index to a conversation timeline according to a timeline for the period of time; and displaying the conversation timeline on a display screen.

20 Claims, 7 Drawing Sheets

(56) References Cited

OTHER PUBLICATIONS

Mehta, Chirag; "US Presidential Speeches Tag Cloud Top 100 Tags"; avaibale on the web at: http://chir.ag/projects/preztags/; Nov. 2, 2006.

Melski, Eric; "Hipstat: visualizing HipChat group chat rooms"; available on the web at: http://blog.melski.net/2013/05/28/hipstat-visualizing-hipchat-group-chat-rooms/; May 28, 2013.

Song, Yang et al; "Real-time Automatic Tag Recommendation"; Jul. 20, 2008.

Zimmer, Bjorn et al; "Applying Heat maps in a Web-Based Collaborative Graph Visualization"; in IEEE Information Visualization, Paris, France 2014.

\* cited by examiner

CONVERSATION TIMELINE MAPPING

FIELD OF THE INVENTION

The present invention generally relates to visually mapping conversational history.

BACKGROUND OF THE INVENTION

Instant messaging (IM) applications such as Jabber, ICQ, WhatsApp Messenger, and Skype are well known. In its basic form, IM provides real-time text communication, often called "posts" or "chats", between two or more participants, thereby supporting a "conversation" between the participants over a communications network, such as, for example, the Internet. IM functionality is also commonly integrated into social networks, such as Facebook (i.e. Facebook Messenger), and collaboration applications, such as, for example, Cisco Spark. Many IM applications also provide more advanced messaging communications options such as file transfer, clickable hyperlinks, voice over IP (VOIP), and/or video chat.

IM and collaboration applications often support maintaining the continuity of an ongoing conversation between its participants by saving the communications as they are sent as a conversation's "history". Some or all of the conversation's history may be presented to the users when accessing a given conversation.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

A method for presenting conversational history is implemented on a computing device and includes: deriving a collaboration activity index as a function of at least a frequency of a conversation's communications over a period of time, mapping the collaboration activity index to a conversation timeline according to a timeline for the period of time; and displaying the conversation timeline on a display screen.

DETAILED DESCRIPTION OF EXAMPLE EMBODIMENTS

It will be appreciated that many users use IM functionality on an almost continuous basis; a single conversation timeline for a conversation between just two users may therefore comprise thousands of posts. In collaborative environments, where a group conversation may involve hundreds of participants using multiple modes of communications, the number of communications in the conversation's history may be even larger. The number of communications in a conversation's history may make it difficult to find specific posts or to trace the evolution of a thread in a conversation.

The mix of different types of communications may also add to the difficulty. For example, while IM chats often account for the overwhelming majority of communications in a given collaborative conversation, it's not unusual for non-IM communications, such as shared documents or recordings of online meetings, to be of greater relative importance than a given IM chat. However, conversation histories typically present all communications in linear historical order (according to a time-stamp created at the time the communication was generated/sent/received) without regard to a mode of communication.

Figure 1:
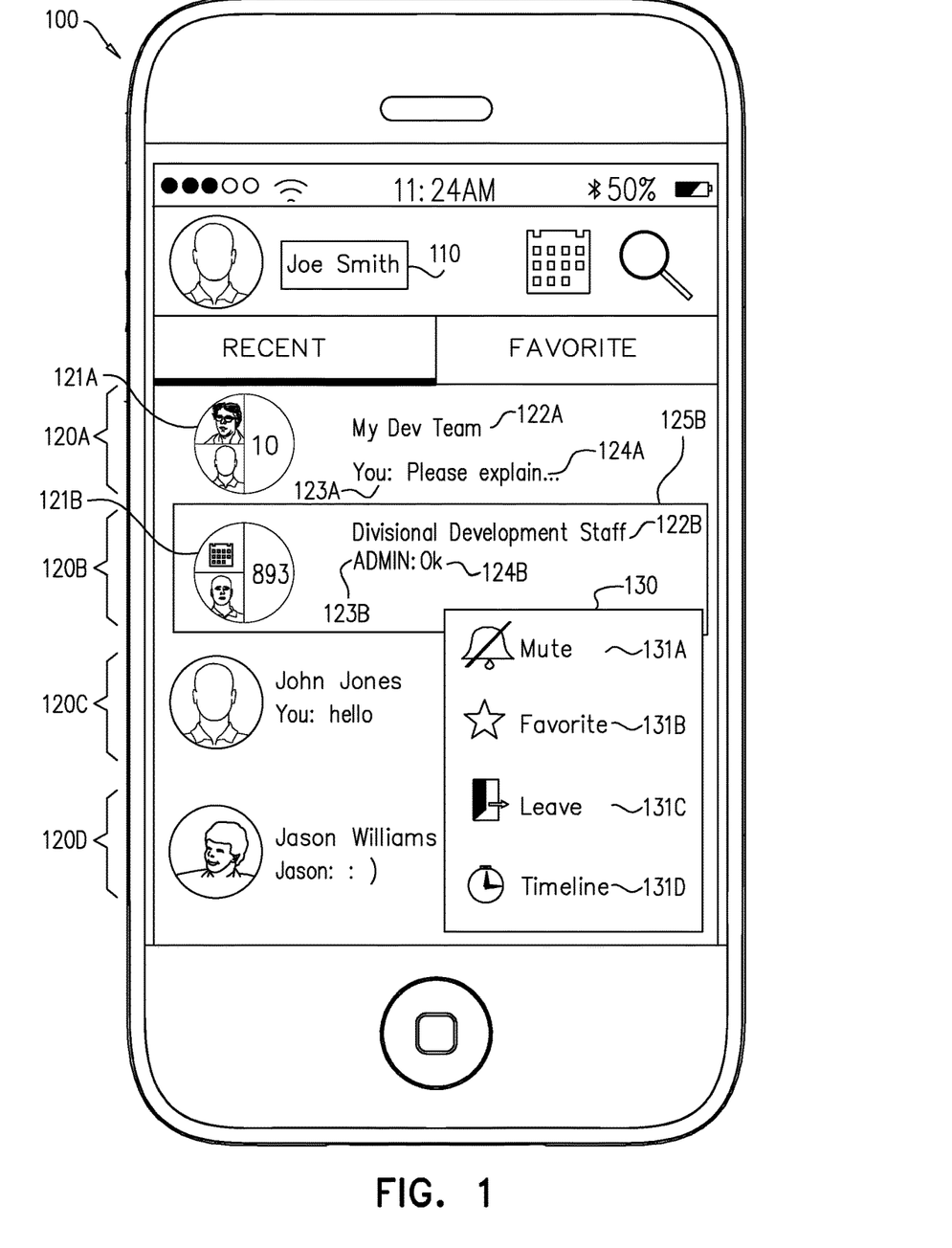
FIG. 1 is a simplified pictorial illustration of a display of an exemplary collaboration application, constructed and operative in accordance with embodiments described herein.

In accordance with embodiments described herein, mapping techniques may be used to provide chat participants with an intuitive and easy-to-understand visual representation of a conversation's history. Reference is now made to FIG. 1 which is a simplified pictorial illustration of an exemplary collaboration application screen 100, constructed and operative in accordance with embodiments described herein.

Collaboration application screen 100 represents an exemplary display of a collaboration application, such as, but not limited to, the mobile version of Cisco Spark. It will be appreciated that other IM, collaboration, and/or social network application environments may also be supported by the embodiments described herein. Collaboration application screen 100 comprises participant name 110, conversation panels 120 and menu 130. It will be appreciated that screen 100 comprises other elements and features that, in the interests of brevity and clarity, may not be explicitly discussed herein. It will similarly be appreciated that conversation labels 120C and 120D may be partially obscured by menu 130. Each conversation panel 120 represents an existing conversation "room", i.e., a virtual room in which participants may contribute to an ongoing conversation. As depicted for conversation labels 120A and 120B, may comprise displays for conversation avatar 121, conversation name 122, last contributor 123 and last post stub 124.

For example, conversation panel 120A comprises conversation avatar 121A, conversation name 122A ("My Dev Team"), last contributor 123A ("You", i.e., the user, "Joe Smith", per participant name 110), and last post stub 124A ("Please explain . . . ") which is a truncated representation of the first characters of the most recent post in the "My Dev Team" conversation. Conversation panel 120B comprises conversation avatar 121B, conversation name 122B ("Divisional Development Staff"), last contributor 123B ("ADMIN"), and last post stub 124B ("Ok") which represents the most recent post in the "Divisional Development Staff" conversation by the user "ADMIN".

In accordance with the exemplary embodiment of FIG. 1, the "Divisional Development Staff" conversation has been selected by the user as the current conversation, and accordingly conversation panel 120B is depicted with emphasized border 125B (partially obscured by menu 130). It will be appreciated that any suitable user interface (UI) method may be used to select a conversation. For example, the user may tap or double tap on a conversation panel 120 in order to select an associated conversation. In a desktop environment, a mouse click or menu option may also be used.

Menu 130 may be selected for display using similar UI methods, i.e., a tap, double tap, mouse click or menu option. Menu 130 comprises a list of menu options 131 that may also be selected using similar UI methods and then applied to the current conversation. For example, selection of menu option 131A may mute the conversation, i.e., relegate it to a lower status; menu option 131B may be selected to designate the conversation as a favorite; and menu option 131C may be used to "leave" the conversation room, i.e., to cease to participate in the conversation.

Figure 2A:
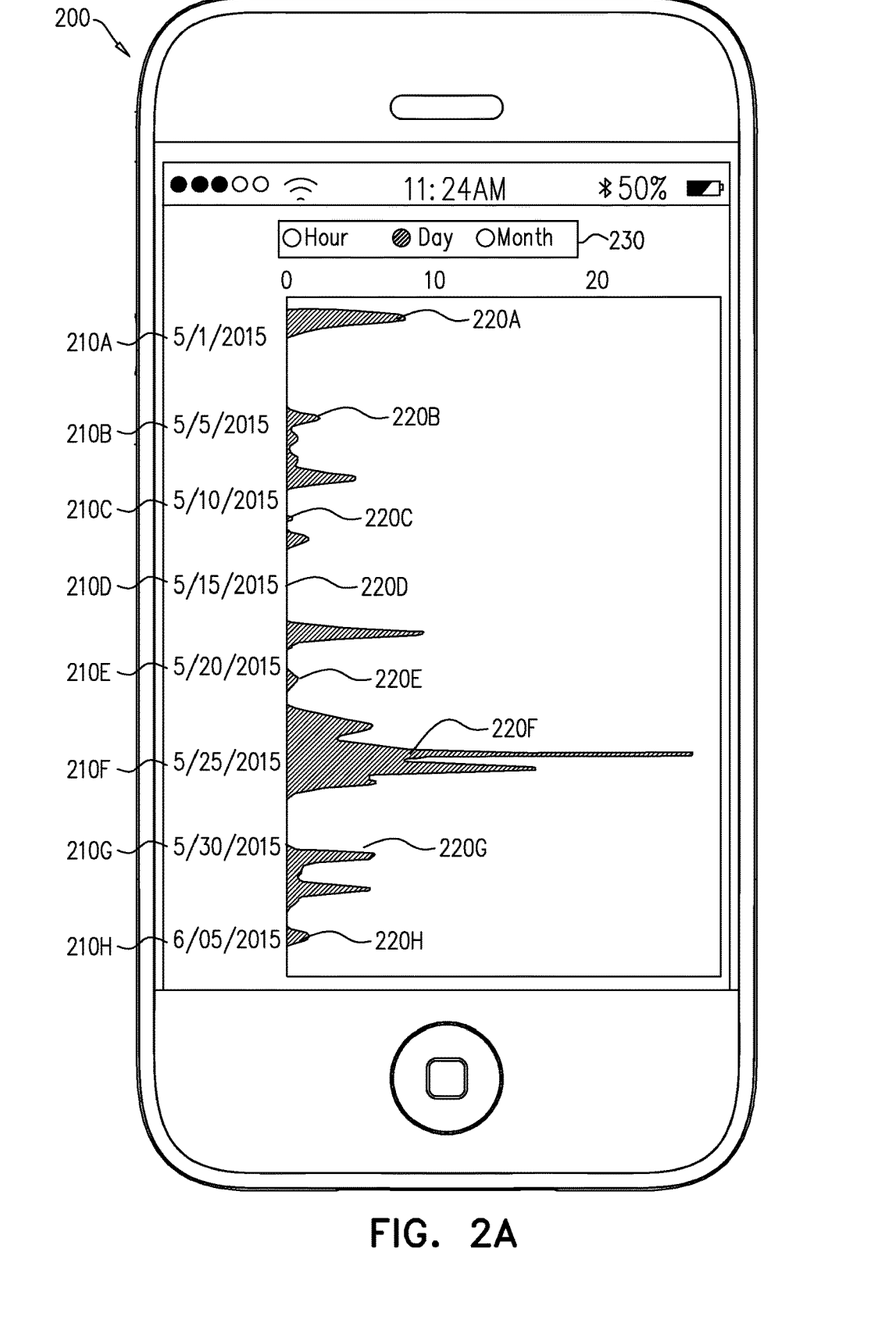
FIGS. 2A-C and 3 are simplified pictorial illustrations of additional displays of the exemplary collaboration application of FIG. 1.

In accordance with embodiments described herein, selection of menu option 131D may provide a visual representation of a conversation's timeline as described with regard to FIG. 2A to which reference is now made. FIG. 2A depicts a simplified pictorial illustration of a heat-map timeline screen 200, constructed and operative in accordance with embodiments described herein. Heat-map timeline screen 200 comprises timeline points 210, heat-mappings 220 and timeline period setting 230. Heat-mappings 220 may indicate the intensity of the conversational history, i.e. frequency of communications along a timeline as denoted by timeline points 210.

Timeline points 210 may be determined according to timeline period setting 230. For example, timeline period setting 230 may be set for "Day". Accordingly, as per the exemplary embodiment of FIG. 2A, each of timeline points 210 may be associated with a day of conversation history. For example, timeline point 210A is associated with May 1, 2015. Each succeeding timeline point 210 is associated with another day of conversation history: timeline point 210B is associated with May 5, 2015; timeline point 210C is associated with May 10, 2015; timeline point 210D is associated with May 15, 2015; timeline point 210E is associated with May 20, 2015; timeline point 210F is associated with May 25, 2015; timeline point 210G is associated with May 30, 2015; and timeline point 210H is associated with Jun. 5, 2015.

In accordance with embodiments described herein, the user may select a desired time slice by tapping on it. It will be appreciated that the embodiments described herein may support the use of other UI gestures and means for entering a time slice selection, such as, for example, double tapping, mouse clicks, menu selections, etc. The selected conversation room may then be opened up and positioned to a display of historical messages as per the selected timeline. The message start position may be the first message at the beginning of the time period.

It will be appreciated that timeline points 210 are reference points for a portion of continuous conversation history; the intervals between timeline points 210 may be configurable. Accordingly, heat-mappings 220 may not necessarily line up precisely with timeline points 210. For example, the timeline area covered by heat-mapping 220A may start somewhat before timeline point 210A. This may indicate that some of the indicated conversation history is from before May 1, 2015, e.g., Apr. 30, 2015. Similarly, heat-mapping 220D may indicate that there were no communications at all in the conversation on May 15, 2015, as per timeline point 210D.

It will also be appreciated that heat-mappings 220 may represent a "collaboration activity index" for a conversation that is based, at least in part, on the quantity of communications for a point in the conversation timeline according to the precision scale displayed below timeline period setting 230. In the exemplary embodiment of FIG. 2A, this scale is depicted as "0, 10, 20". Accordingly, based on the scale, heat-mapping 220B may indicate that on May 5, 2015 (per timeline point 210B) there were two communications in the conversation. Heat-mapping 220C may indicate that there were no communications May 11, 2015.

It will be appreciated that the overall precision of the representation by the information provided by heat-mappings 220 may be a function of the precision scale combined with timeline period setting 230. In general, the more granular the combination, the more precise the representation may be. However, in any case, heat-mappings 220 as displayed may at least provide a reasonable indication of relative numbers of communications. Accordingly, while in the exemplary embodiment of FIG. 2A it may not be entirely clear that heat-mapping 220B represents two communications, instead of one or three, it will be appreciated that it may be easily distinguished that the number of communications represented by heat-mapping 220B is greater than the number represented by heat-mapping 220E, similar to the number represented by heat-mapping 220H, and less than the number represented by heat-mapping 220G. Furthermore, as will be described hereinbelow, some of the communications may be weighted in the collaboration activity index, thereby yielding non-integer representations.

In accordance with some embodiments described herein, the displayed precision scale may also be determined autonomously as a function of at least the range of currently displayed heat-mappings 220. For example, as depicted in FIG. 2A, heat-map 220F may indicate a collaboration activity index approaching thirty for the associated timeline point 210F. Accordingly, the precision scale may be autonomously adjusted to facilitate the presentation of heat-maps 220 with values of zero to thirty (where the outer limit of the presented scale is thirty, such that the number thirty may not need to be actually presented as in FIG. 2A.

In accordance with embodiments described herein, any suitable algorithm may be used to derive the "collaboration activity index" to be associated with a conversation's communications. For example, to represent IM posts, the number of chat messages between time T1 and time T2 may provide an IM activity index as per the following formula:

$$\text{Index}_{chat}(T1,T2) = \Sigma_{T2}^{T1} \text{Frequency}_{chat}$$

For a continuous collaboration activity, such as an online team meeting, the index of activity in the chart may be a base value plus time*weight, as follows:

$$\text{Index}_{online\_meeting}(T1,T2) = \Sigma_{T1}^{T2} (\text{Value}_{base} + t_{meeting} * W_{meeting\_time});$$

where: $\text{Value}_{base}$ is the base value for an online meeting that is launched and contributes to an online meeting collaboration index. $t_{meeting}$ is length of meeting time, and $W_{meeting\_time}$ is a statistical weight according to which that meeting time contributes value to the collaboration index. $\text{Index}_{online\_meeting}(T1,T2)$ may therefore represent an online meeting collaboration index to which all launched meetings between time T1 and time T2 contribute.

The overall collaboration activity index for the all of the modes of communication in a conversation may therefore be derived as:

$$\text{Index}_{collaboration}(T1,T2) = \text{Index}_{chat}(T1,T2) * W_{chat} + \text{Index}_{online\_meeting}(T1,T2) * W_{online\_meeting} + \ldots;$$

where: $W_{chat}$ refers to the statistical weight that IM chats contribute to the overall collaboration activity index, and $W_{online\_meeting}$ refers to the statistical weight of online meeting contributions. It will be appreciated that there may be other modes of communication used in the conversation, such as, for example, document sharing or video calls; their associated activity indexes may be derived in similar fashion and the component index added to $\text{Index}_{collaboration}(T1, T2)$.

It will be appreciated by one of skill in the art that by differentiating between the values of $W_{chat}$ and $W_{online\_meeting}$ it may possible to emphasize or de-emphasize one mode of communication vis-à-vis another when presenting heat-mappings 220. For example, if $W_{chat}$ is set as 1.0 and $W_{online\_meeting}$ is set as 1.5, greater weight will be attributed to online meetings in the representation of heat-mappings 220.

In accordance with embodiments described herein, the user may use a UI gesture such as a finger moving along screen 200, a tap, menu selection, or other known UI means for selection (such as a mouse click or hover for a desktop application) on heat-map timeline screen 200 to open up the conversation history in accordance with a point in the conversation timeline generally consistent with the timeline as indicated by timeline points 210.

In accordance with embodiments described herein, additional information regarding the nature or subject of the communications may be available in response to another UI gesture. For example, tapping on heat-mapping 220F may yield a result as shown in FIG. 2B, to which reference is now made.

Figure 2B:
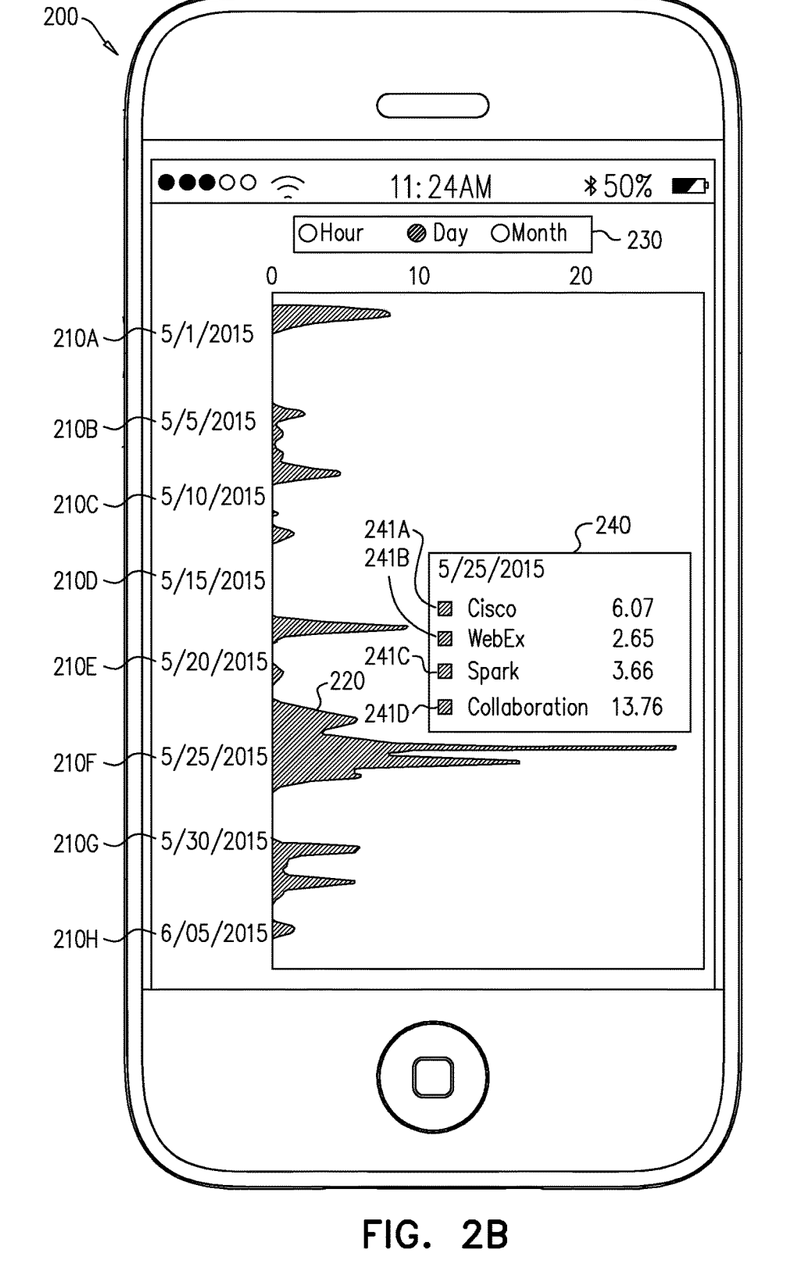

FIG. 2B depicts heat-map timeline screen 200 which may be generally similar to that depicted in FIG. 2A; similar reference numerals may refer to similar elements. However, heat-map timeline screen 200 may also comprise topic detail popup window 240 which may provide more granular details regarding the topics, i.e., subjects, of the posts associated with a given heat-mapping 220. In the exemplary embodiment of FIG. 2B, topic detail popup window 240 comprises a series of topic detail lines 241 which may indicate the collaboration activity index associated with a given topic for an associated heat-mapping 220.

For example, topic detail line 241A may have a value of "Cisco: 6.07" to indicate that for that time period, i.e., May 25, 2015 as per timeline point 210F, there was a collaboration activity index of 6.07 associated with the topic "Cisco". Similarly, topic detail line 241B may indicate that for the same time period there was a collaboration activity index of 2.65 associated with the topic "WebEx"; topic detail line 241C may indicate that there was a collaboration activity index of 3.66 associated with the topic "Spark"; and topic detail line 241D may indicate that there was a collaboration activity index of 13.76 posts associated with the topic "Collaboration". It will be appreciated by one of ordinary skill in the art that the numbers displayed in topic detail lines may not necessarily be integers; depending on the weights assigned for each mode of communication, the collaboration activity index may be expressed as a non-integer. It will similarly be appreciated that there may not necessarily be a one-to-one relationship between the total of the numbers displayed in topic detail lines 241 and the collaboration activity index represented by the associated heat-mapping 220. For example, some of the posts may be apportioned to multiple topics. Also, in some cases it may not be possible to associate a given post with a specific topic.

In accordance with embodiments described herein, special characters, such as, for example, hashtags, may be used to denote a topic in a communication. For example, in the exemplary embodiment of FIG. 2B, the participants of the conversation may differentiate between the different topics of the conversation by embedding "#Cisco#", "#WebEx#, #Spark#, or #Collaboration# in the body of a communication, such as, for example, an IM chat. It will be appreciated that the use of hashtags may be exemplary; other special characters may also be used, such as, for example, ampersands, asterisks, dollar signs, etc. Varying combinations may also be used, e.g. a leading ampersand with a following asterisk. The values for topic detail lines 241 may therefore be a function of at least the number of times a given topic is embedded in a communication for the given time period.

It will also be appreciated that the use of special characters to denote topics for communications such as IM chats may rely on user conventions. However, some modes of communication may facilitate or require inputting a subject. For example, if the conversation history also includes email, email subjects may be used to denote or at least derive an associated topic.

In accordance with some embodiments described herein, topics may also be determined based on real-time analysis of the frequency of words in input communications. It will be appreciated by one of ordinary skill in the art that it may be possible to focus the analysis on the frequency of nouns in the communications; the primary component of the name of a topic is typically a noun. Accordingly, it may be possible to detect a topic in text without analyzing verbs, adjectives, prepositions, etc.

The analysis may be based on a specified detection duration with a defined threshold for the occurrence of target words such as nouns. Occurrences of target words in ongoing communications may be tracked. Target words that reach or exceed the threshold within the detection duration may be added to a potential topic word list. Words in the potential topic word list may be prompted to a user in a bubble style UI, similar, if not necessarily identical to topic detail popup window 240. The user may add to conversation topics list by using the UI to select from the potential topic word list. It will be appreciated that the analysis may be executed on a periodic basis. Alternatively, instead of placement in a potential topic word list, the target words with occurrences in excess of the threshold may be autonomously added to the conversation topic list. The conversation topic list may then be used to determine topics for ongoing communications.

It will be appreciated that other methods may be employed to populate the conversation topic list. For example, an automatic tag recommendation system, such as that disclosed by in *Real-time Automatic Tag Recommendation* by Song et. al. in SIGIR'08, Jul. 20-24, 2008, Singapore.

It will be appreciated that topics may be associated with more than just IM chat, but also in online group meetings, video calls etc. In some cases, the topic may be detectable in the form of a meeting title, document title, etc. Speech-to-text techniques may also be employed for online group meeting and video calls to derive the text script and then extract the topics.

It will also be appreciated by one of ordinary skill in the art that different topics or kinds of topics may be assigned different statistical weight as per the discussion hereinabove with regard to derivation of the collaboration activity index.

In accordance with embodiments described herein, a timeline ruler line may be displayed to indicate a current position relative to timeline points 210. It will be appreciated that in order to represent intense conversational activity within large, active groups, the calculation time unit of index for the timeline ruler line may be set in terms of minutes, seconds, or even millisecond levels. It will similarly be appreciated that such intense activity may be represented visually as the curved border area of heat-mappings 220. In accordance with an exemplary embodiment, the time unit of index for the timeline ruler line day as the period unit may be set as one day. In such an embodiment, window 240 may show topic detail for the day indicated by the ruler line.

Figure 2C:
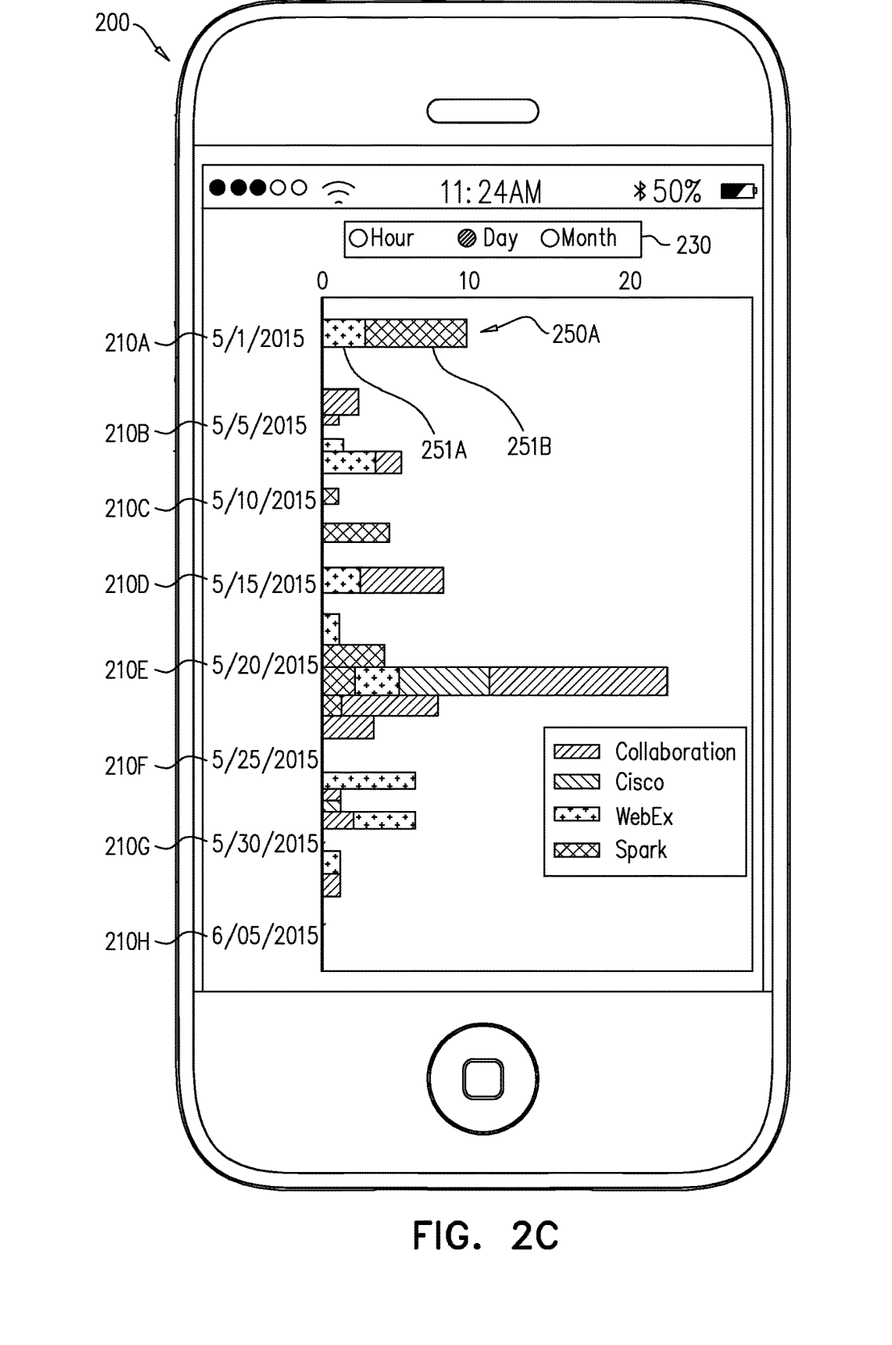

It will further be appreciated that the presentation of the collaboration activity index may not necessarily be limited to heat-mappings per se. Other types of graphs may also be used. For example, as depicted in FIG. 2C, to which reference is now made, the collaboration activity index may be presented in histogram form. In accordance with the embodiment of FIG. 2C, histograms such as histogram 250A, may be used instead of heat-mappings 220 to represent the collaboration activity index. Histogram 250A may also be color coded or shaded to reflect the relative contribution of each topic to the conversation history per timeline points 210. For example, histogram element 251A may be associated with the "WebEx" topic, and histogram element 251B may be associated with the "Spark" topic. If a user enters a UI gesture (such as those described hereinabove) directly on a histogram element 251, the conversation may be opened to the first contribution in the associated topic per the timeline as outlined by timeline points 210.

Figure 3:
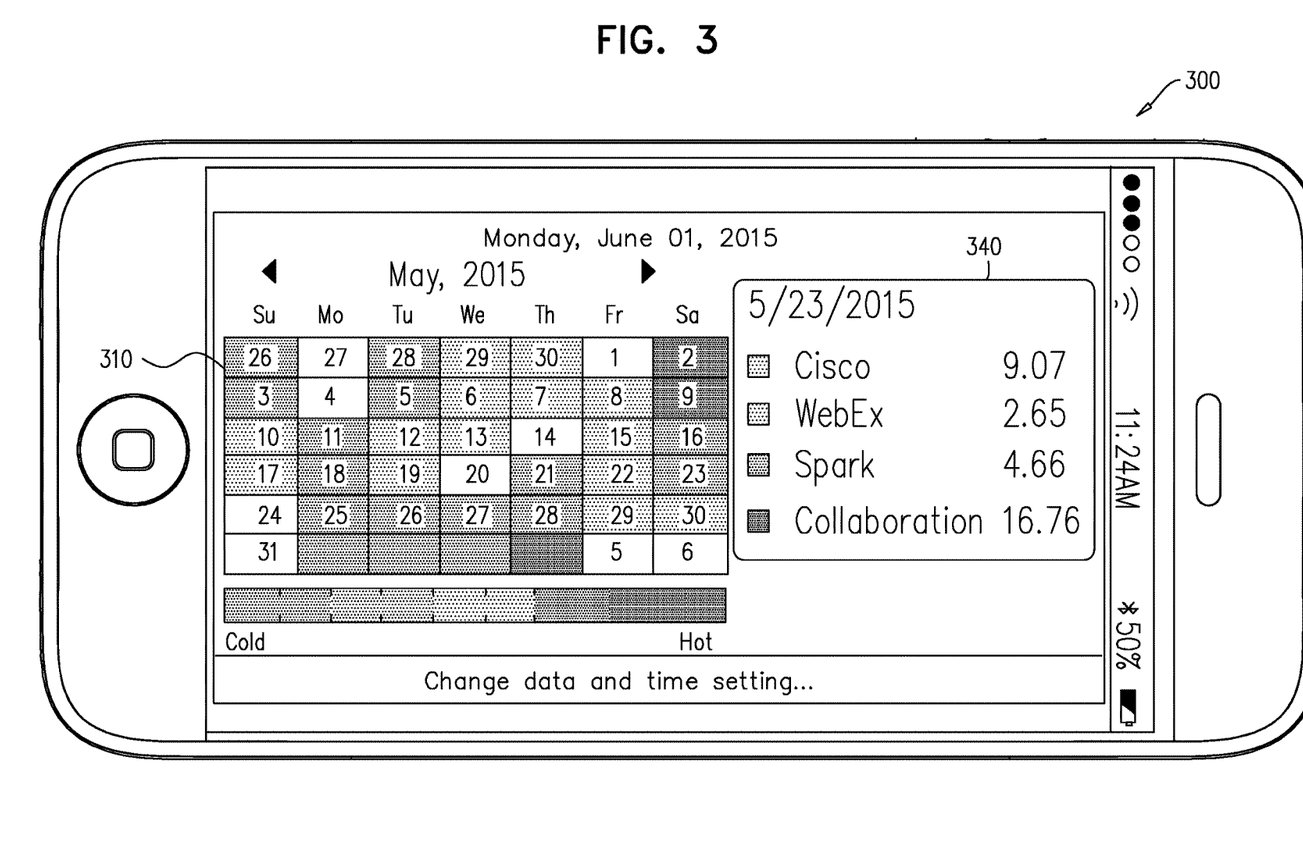

Reference is now made to FIG. 3. In accordance with embodiments described herein, the collaboration activity index may be represented in a calendar based format. As shown in the exemplary embodiment of FIG. 3, a weekly calendar presentation may be displayed, where each day is color coded or shaded to show the relative "heat" of the collaboration activity index for a given day, where a sliding scale between "cold" and "hot" is presented to aid the user. Similar to the embodiment of FIG. 2B, topic detail popup window 340 may provide additional details regarding the topics discussed in the associated day, e.g., the collaboration activity index according to topics for May 23, 2015.

It will be appreciated by one of ordinary skill in the art that the embodiments of FIGS. 2A-C and FIG. 3 may support any suitable functionality for scrolling up and down to access and display previously non-displayed portions of the conversation's timeline. Such functionality may be implemented, for example, using sliding UI gestures, scroll bars or menu selections. In response to such scrolling, timeline points 210, heat-mappings 220, windows 240, and/or histograms 250 may be adjusted and redisplayed to reflect values appropriate for a different portion of the timeline. For example, instead of displaying timeline points 210 and heat-mappings 220 for the month of May 2015 as per the exemplary embodiments, after scrolling April or June 2015 may be displayed. It will also be appreciated that scrolling may be combined with resetting of timeline period setting 230 to calibrate a position in the timeline. For example, a user may first select "month" for timeline period setting 230, scroll to an approximate position in the timeline, and then change timeline period setting 230 to a smaller unit of time in order to facilitate scrolling to a more precise position within the timeline.

Figure 4:
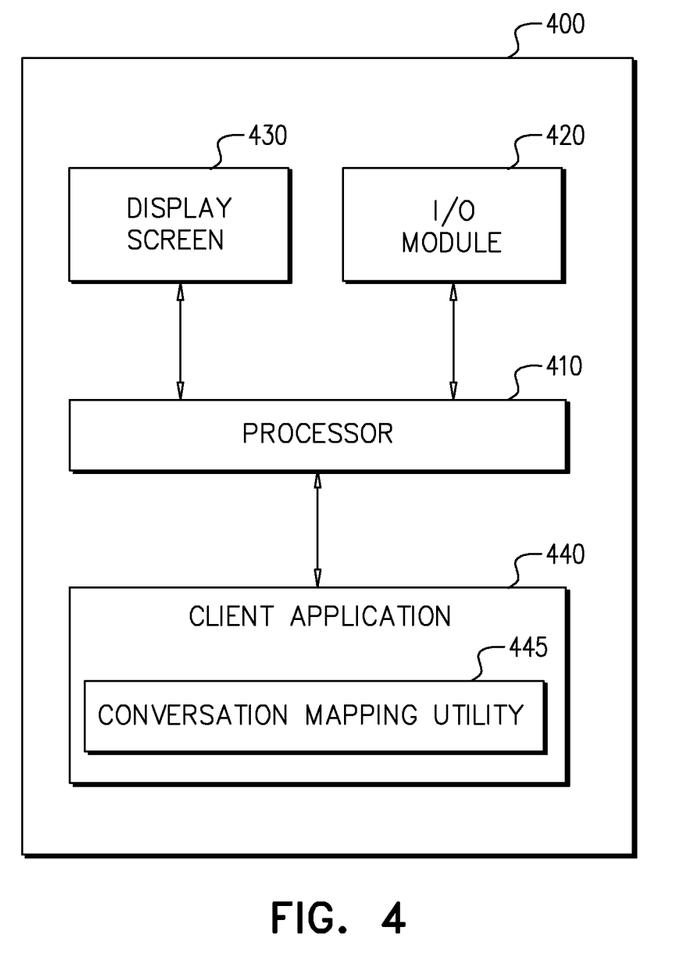
FIG. 4 is a block diagram of a computing device operative to run the exemplary collaboration application of FIG. 1.

Reference is now made to FIG. 4 which is a block diagram of a computing device 400 operative to execute the exemplary collaboration application of FIGS. 1-3, constructed and operative in accordance with embodiments described herein. Computing device 400 may be implemented as any suitable computing device such as, but not limited to, a personal computer, laptop computer, computer tablet, or smartphone that may be operative to provide the functionality described hereinabove with reference to FIGS. 1-3.

It will be appreciated by one of skill in the art that computing device 400 comprises hardware and software components that may provide at least the functionality of the embodiments described herein. For example, computing device 400 may comprise at least processor 410, I/O module 420, display screen 430, and client application 440. I/O module 420 may be implemented as a transceiver or similar means suitable for transmitting and receiving data between computing device 400 and another device. In accordance with some embodiments described herein, display screen 430 may be implemented as a touchscreen, however, as noted hereinabove, menu selections and/or mouse clicks may be used to compensate for a lack of touchscreen functionality. It will be appreciated that display screen 430 may be implemented as a built-in integrated component of computing device 400, or alternatively as an attached peripheral device.

Client application 440 may be any suitable application implemented in software and/or hardware that may be operative to facilitate a user's ongoing participation in a conversation as described hereinabove. It will be appreciated that computing device 400 may comprise more than one processor 410. For example, one such processor 410 may be a special purpose processor operative to execute client application 440. Client application 440 comprises conversation mapping utility 445. Conversation mapping utility 445 may be implemented in software and/or hardware and may be employed as necessary by client application 440 to derive and present visual representations of a conversation's timeline based on communications transmitted/received by client application 440, typically via I/O module 420. It will be appreciated by one of ordinary skill in the art that some or all of the functionality of conversation mapping utility 445 may be implemented on an collaboration server (not shown) that may be configured to facilitate collaborative communications between client applications 440 on different computing devices 400. For example, the collaboration server may store some or all of the conversation history used to derive the activity indexes described hereinabove. The application server may also perform some or all of the computations necessary to derive the activity indexes on behalf of conversation mapping utility 445.

Figure 5:
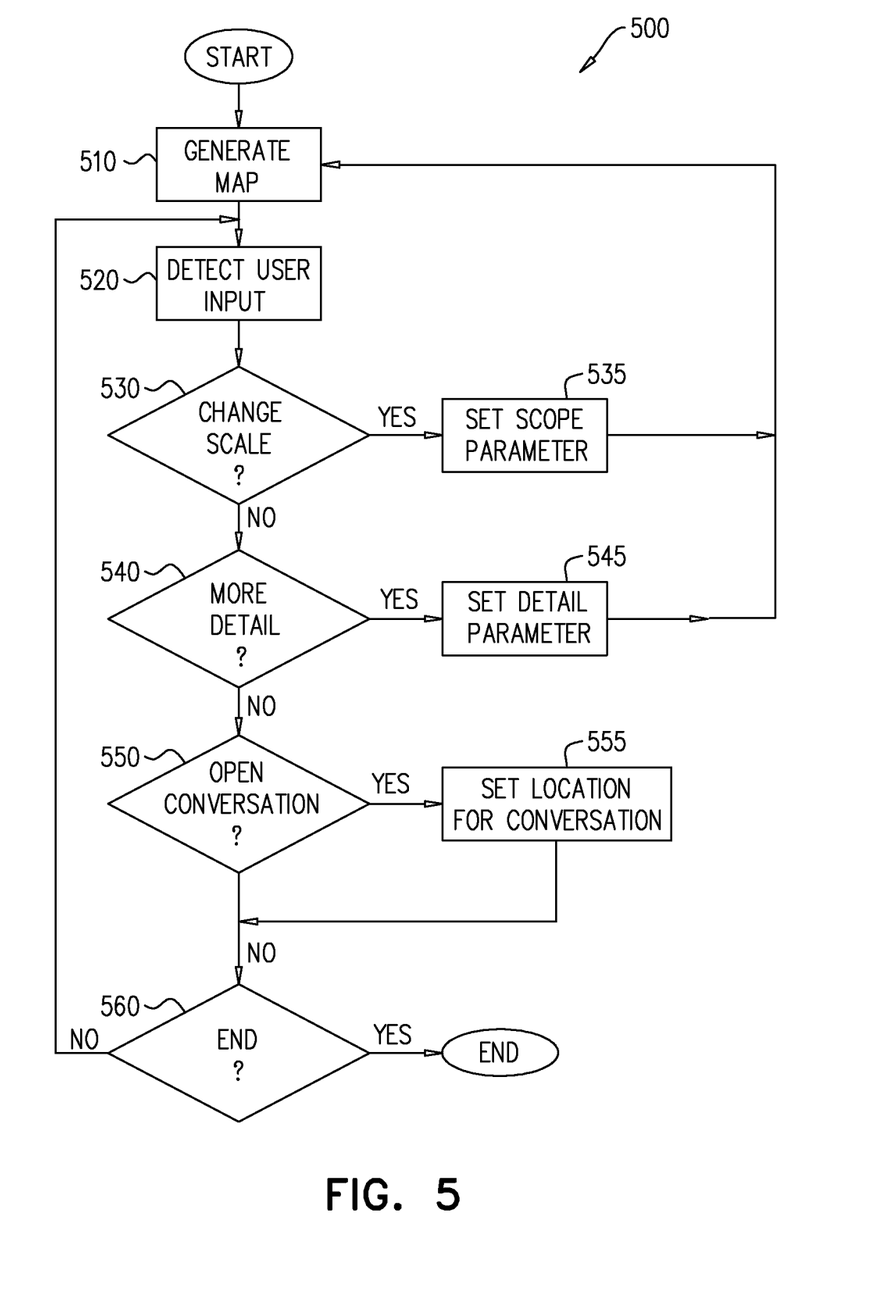
FIG. 5 is a flowchart of an exemplary process to be executed on the computing device of FIG. 4 to provide the exemplary collaboration application of FIG. 1.

Reference is now made to FIG. 5 which illustrates a visual conversation timeline process 500, constructed and operative in accordance with embodiments described herein. Process 500 may be used by client application 440 to present visual representations of a conversation's timeline. Client application 440 may invoke conversation mapping utility 445 to generate (step 510) and present on display screen 430 a visual map of the conversation's timeline, such as heat-mappings 220 from FIG. 2A or histogram 250 from FIG. 2C.

Client application 440 may detect (step 520) a UI gesture. It will be appreciated that the UI gesture used may be configurable. Process 500 may be configured to detect and recognize any suitable UI gesture, or combination of UI gestures (step 520). Non-limiting examples of such UI gestures may include: a sliding finger, tap, double tap, menu selection, mouse click, or double click.

If the UI gesture indicates a request to change the scale of presentation (step 530), client application 440 may invoke conversation mapping utility 445 to set (step 535) a scope parameter for the displayed collaboration activity index. By way of illustration, the UI gesture to perform step 535 may involve a change to timeline period setting 230 (FIG. 2A-C), e.g., selecting "Hour" or "Month" instead of "Day". Control may then return to step 510 where conversation mapping utility 445 may regenerate the visual representation of the conversation's timeline in accordance with the new scope to present the conversation's timeline in the new scale.

If the UI gesture indicates a request to add more detail to the presentation (step 540), client application 440 may invoke conversation mapping utility 445 to set (step 545) a detail parameter for the presentation. By way of illustration, the UI gesture to perform step 545 may involve a request to display topic detail popup window 240 (FIG. 2B). It will be appreciated that step 545 may not be limited to only setting a parameter for the level of detail for "topics". For example, a timeline detail popup window similar to topic detail popup window 240 may also be used to show details according to mode of communications for the timeline period in question, e.g., according to "IM", "online meeting", "shared document", etc. Control may then return to step 510 where conversation mapping utility 445 may regenerate the visual representation of the conversation's timeline along with a communication detail popup window, similar in form to topic detail popup window 240, detailing the associated conversation activity index according to mode of communication.

If the UI gesture indicates a request to open the conversation (step 550), i.e. to display the associated items of communication from the conversation's history, client application 440 may invoke conversation mapping utility 445 to set (step 555) a location parameter indicating a location for the conversation. Conversation mapping utility 445 may set the location parameter at least in accordance with the proximity of the placement of the UI gesture to a relative position along the conversation's timeline as denoted by timeline points 210 (FIGS. 2A-C). For example, if the UI gesture is a tap or double tap (or other suitable UI gesture) on heat-mapping 220F (FIG. 2A) the location parameter may be set as per the associated timeline as May 25, 2015 (as denoted by timeline point 210F (FIG. 2A)).

Alternatively, or in addition, the location may be set more granularly if the UI gesture is entered on a topic detail line 241 (FIG. 2B). For example, if the UI gesture is a tap or double tap (or other suitable UI gesture) on topic detail line 241A, the location parameter may be set as the first communication with the "Cisco" topic on May 25, 2015. Similarly, if the UI gesture is a tap or double tap (or other suitable UI gesture) on histogram element 251 (FIG. 2C) the location may be set as the first communication with the "WebEx" topic on May 1, 2015. Step 555 may also including setting process 500 to end, with a "next process" set as "display conversation history" which will use the location parameter to determine at which point in the timeline the conversation history should be initially displayed, i.e., the actual item(s) of communication to be displayed are determined as a function of the location parameter and a time-stamp for the item(s). It will be appreciated by one of ordinary skill in the art that "displaying" an item may entail first displaying an indication of the item. For example, for a recording of an online meeting, a hyperlink may be displayed that may in turn be used to access the recording. Similarly, for a shared document, a hyperlink or icon may be displayed that may require an additional selection before opening the associated stored communication.

If process 500 is set to end (step 560), either by user request by UI gesture or as set by step 555, process 500 may end, and a next process may be performed. Otherwise, if the UI gesture cannot be parsed, control may return to step 520. It will be appreciated that process 500 may also support other functionality that in the interests of clarity has not been specifically detailed herein. For example, the user input detected in step 520 may represent known functionality for scrolling as discussed hereinabove. It will therefore be appreciated that process 500 may also support receiving a scrolling request and adjusting/redisplaying the affected elements as necessary.

It will therefore be appreciated that the embodiments described herein provide a system and method for providing a starting location according to timeline within a conversation history based on, at least, activity levels and/or topics. The advantages provided by the embodiments include: provision of an easy-to-use and understandable historical view of activity for a given conversation; derivation and presentation of topics for the "hottest" periods in the conversation's history; and an easy-to-use method to identify and present a desired position in the conversation history.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for presenting conversational history, the method implemented on a computing device and comprising:
   analyzing the conversational history for nouns that appear in the conversational history at a threshold frequency over a period of time;
   generating, in response to the analyzing, a list of topics from the nouns that appear in the conversational history at the threshold frequency over the period of time;
   associating communications within the conversational history with topics in the list of topics;
   deriving a collaboration activity index as a function of at least a frequency of the communications of the conversational history associated with topics in the list of topics over the period of time;
   mapping said collaboration activity index to a conversation timeline according to a timeline for said period of time; and
   displaying said conversation timeline on a display screen as a histogram illustrating relative contributions of the topics of the list of topics to the conversational history as a function of time.

2. The method according to claim 1 and wherein the communications of the conversational history comprise instant messaging (IM) chats.

3. The method according to claim 1 and wherein the communications of the conversational history comprise indications of at least one of online meetings, shared electronic documents, or calling activity.

4. The method according to claim 1, wherein analyzing the conversational history comprises:
   retrieving at least details of the communications of the conversational history from a collaboration server.

5. The method according to claim 1 and wherein said deriving comprises receiving said collaboration activity index from a collaboration server.

6. The method according to claim 1 and wherein said deriving comprises:

deriving a different component index for each mode of communication in the communications of the conversational history;

adding together said different component index for each mode of communication to derive said collaboration activity index.

7. The method according to claim 1 and wherein said deriving comprises:

weighting said frequency according to different nodes of communication used for the communications of the conversational history.

8. The method according to claim 1 and wherein said deriving comprises:

weighting said frequency according to said topics of the list of topics.

9. The method according to claim 1, wherein relative values along said conversation timeline graph are expressed as a function of area and color, shade, or background pattern.

10. The method according to claim 1 and further comprising:

detecting a user interface (UI) gesture associated with a location on said displayed conversation timeline;

interpreting said UI gesture as a request to present items from the communications of the conversational history;

determining a point in said timeline according to at least said location on said displayed conversation timeline;

determining a first item from among said items as a function of at least a correlation between said point in said timeline and time-stamps of said items: and displaying at least an indication of at least said first item.

11. The method according to claim 1 and also comprising: displaying a timeline detail popup window, wherein said timeline detail popup window presents a detailed collaboration activity index with an additional level of detail for said collaboration activity index for at least a point on said timeline.

12. The method according to claim 11 and wherein said additional level of detail is said collaboration activity index detailed according to topics of the communications of the conversational history.

13. The method according to claim 11 and wherein said additional level of detail is said collaboration activity index detailed according to modes of said conversation's communications.

14. The method according to claim 11 and also comprising:

displaying a ruler line on said conversation timeline in accordance with a current position in said timeline;

detecting scrolling requests; and adjusting said current position of said ruler line in accordance with said ruler line, wherein said at least a point on said timeline is determined in accordance with said adjusted current position.

15. The method according to claim 11 and further comprising:

detecting a UI gesture associated with a location on said detailed collaboration activity index;

interpreting said UI gesture as a request to present items from the communications of the conversational history according to said at least one point in said timeline;

determining a first item from among said items as a function of at least a correlation between said at least one point in said timeline, time-stamps of said items, and said location on said detailed collaboration activity index; and displaying at least an indication of at least said first item.

16. An apparatus comprising:

a memory;

a display screen; and a processor, wherein the processor is configured to:

analyze a conversational history stored in the memory for nouns that appear in the conversational history at a threshold frequency over a period of time;

generate a list of topics from the nouns that appear in the conversational history at the threshold frequency over the period of time;

associate communications within the conversational history with topics in the list of topics;

derive a collaboration activity index as a function of at least a frequency of the communications of the conversational history associated with topics in the list of over the period of time;

map said collaboration activity index to a conversation timeline according to a timeline for said period of time; and display said conversation timeline on the display screen as a histogram illustrating relative contributions of the topics of the list of topics to the conversational history as a function of time.

17. The apparatus of claim 16, wherein the communications of the conversational history comprise instant messaging (IM) chats.

18. The apparatus of claim 16, wherein the communications of the conversational history comprise indications of at least one of online meetings, shared electronic documents, or calling activity.

19. A tangible, non-transitory medium storing instructions, wherein the instructions, when executed by a processor, are operable to:

analyze a conversational history stored in a memory for nouns that appear in the conversational history at a threshold frequency over a period of time;

generate a list of topics from the nouns that appear in the conversational history at the threshold frequency over the period of time;

associate communications within the conversational history with topics in the list of topics;

derive a collaboration activity index as a function of at least a frequency of the communications of the conversational history associated with topics in the list of over the period of time;

map said collaboration activity index to a conversation timeline according to a timeline for said period of time; and display said conversation timeline on a display screen as a histogram illustrating relative contributions of the topics of the list of topics to the conversational history as a function of time.

20. The tangible, non-transitory storage medium of claim 19, wherein the communications of the conversational history comprise instant messaging (IM) chats.

* * * * *